United States Patent

[11] 3,618,769

[72] Inventor: Manuel Adroer Iglesias
Tavern 50, 2, 1, Barcelona, Spain
[21] Appl. No. 857,423
[22] Filed Sept. 12, 1969
[45] Patented Nov. 9, 1971
[32] Priorities Sept. 19, 1968
[33] Spain
[31] 358,307;
May 22, 1969, Spain, No. 367,556

[54] APPARATUS FOR ION EXCHANGE PROCESS CONTROL
7 Claims, 11 Drawing Figs.
[52] U.S. Cl. .................................................. 210/85, 210/25, 210/96
[51] Int. Cl. .................................................. B01d 35/14
[50] Field of Search ........................................ 210/25, 85, 96

[56] References Cited
UNITED STATES PATENTS

| | | | |
|---|---|---|---|
| 2,938,868 | 5/1960 | Carlson et al. | 210/96 X |
| 3,172,037 | 3/1965 | Pfeiffer | 210/96 X |
| 3,176,844 | 4/1965 | Nelson | 210/96 |
| 3,383,310 | 5/1968 | Ammer | 210/96 X |

Primary Examiner—Samih N. Zaharna
Attorney—Birch, Swindler, McKie and Beckett

ABSTRACT: A method and apparatus for ion exchange process control which delivers a voltage proportional to the quotient of two resistances, a first resistance being measured between two electrodes disposed in a ion exchange bed near the point where the effluent leaves and a second resistance being measured between two electrodes in an insulated cell full of exhausted resin, the untreated liquid passing through the cell before entering the ion exchange device. The voltage is amplified and operates a reading instrument and delivers two signals, the presence or absence of such signals triggers a warning and/or an automatic regeneration process.

APPARATUS FOR ION EXCHANGE PROCESS CONTROL

This invention relates to an apparatus which is of use in ion exchange process control and which produces an indication and/or a control signal when an ion exchanger is exhausted and need regenerating, a very useful feature since it obviates the need for periodical effluent analyses.

Of course, the resistivity of an ion exchange resin varies according to the ion which neutralizes the active points of the resin. For instance, the resistivity of a cation exchange resin varies according as it is in sodium or calcium or magnesium form; i.e., in the first case resistivity is lower than in the other cases.

This feature has been used in the construction of various apparatus for detecting exhaustion of an ion exchange bed, on the basis that exhaustion increases from the place of effluent entry to the place of effluent exit—i.e., the bottom part of the bed, which is generally the part nearest the exit, remains substantially in its original form substantially until the end of the process. There is also a transition zone whose width varies but which is always relatively narrow and which descends through the bed during the process. This invention starts from these features.

The apparatus according to the invention equivalent to the resistance of the exhausted ion exchange material delivers a signal which may be a voltage proportional to the quotient of two resistances, of which the one appearing in the numerator may be the resistance measured between at least two electrodes disposed in an ion exchange bed at a small distance from the part thereof where the effluent leaves, whereas the resistance appearing in the denominator may be the resistance measured between at least two electrodes disposed in a cell made of an insulating material and full of exhausted resin, the untreated liquid passing through the latter cell before entering the ion exchange device; after appropriate amplification such voltage may be used to operate a reading instrument and/or to deliver, for example, two signals at two different levels via appropriate digital circuits, one such signal being delivered when the voltage reaches a value corresponding to the resin being exhausted and the other such signal being delivered when the voltage reaches a value which is slightly lower but near the voltage corresponding to the regenerated resin free from regenerating solution; and the presence or absence of such signals is used to trigger a warning and/or an automatic regeneration process, indicate the completion of expulsion of the regenerating agent and, where applicable, change over the system of open and closed valves to allow the treated effluent to pass or, in an automatic regeneration process, to trigger a warning if for any reason the regenerating solution has not penetrated into the exchange bed.

The receptacle for the exhausted resin can, according to the principles of the invention, be replaced by two parallel-connected resistances, one of which is a fixed resistance and the other of which is a receptacle having electrodes, the liquid or solution to be treated flowing through the last-mentioned receptacle before entering the exchange bed.

According to another feature of the invention, the resistance in parallel with the receptacle can take the form of a group of resistances in series and parallel to one another, one of the resistances being a thermistor or resistance varying with temperature, such resistance being disposed in the tube flowed through by the liquid before treatment, so that the invention is out of contact with the liquid but is at the same temperature as the latter, the total resistance value varying substantially proportionally and at various temperatures to the resistivity which exhausted resin immersed in the liquid before treatment would have.

If the exhausted-resin receptacle is replaced by two parallel resistances, one of which is a fixed intrinsic resistance of the resin in whatever state it happens to be while the other is a variable resistance formed by the solution in which the resin is immersed, the system can give only an approximate result, as will be apparent if the resin bed is considered schematically, with the fixed resistance represented by the resin pellets and the variable resistance being represented by the solution which forms a continuous medium. Nevertheless, since the resin does not form a continuous medium and the solution in which the pellets are immersed provides electrical continuity therebetween, a resistance due to the solution must be assumed to exist in series with the intrinsic resistance of the resin.

In accordance with this more accurate criterion, the system for reproducing the between-electrodes resistance of an immersed resin mass comprises two resistance arms, one such arm taking the form of a resistance measured through the water between electrodes in a receptacle, the other such arm being in parallel with the first arm and comprising a fixed resistance and the resistance measured through the water in a second receptacle whose characteristics are such that the resistance measured therein is less than the resistance measured in the first receptacle.

According to another feature, to reproduce the between-electrodes resistance of an immersed resin mass, one of the two resistance arms is a fixed resistance and the other arm in parallel with the first arm is a fixed resistance which is less than the first resistance and which is in series with the resistance measured through the solution between the electrodes of a receptacle.

According to another feature of the invention, to compensate for variations of resin temperature, each of the fixed resistances hereinbefore referred to can be replaced by a thermistor in parallel with a fixed resistance, the system being in series with another fixed resistance, so that although they are at the solution temperature, the thermistors are not in direct contact with the solution.

For a better understanding of the foregoing, a description will now be given by way of example of some embodiments of this invention;

Figure 1:
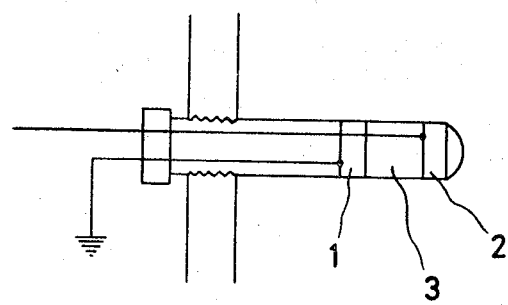
FIG. 1 is a diagrammatic view of a first embodiment of a pair of electrodes for the resin.

The description of a preferred embodiment and alternatives thereto given hereinafter will be based on the process of water softening—i.e., substitution of calcium and magnesium by sodium ions—but the invention is not to be understood as being limited to water softening.

If two electrodes are placed at a distance of approximately 12–15 cm. from the end of an exchange column and resistance readings are taken as the process is performed, the resistance will be found to have a constant value until the electrodes reach the transition zone, whereafter the resistance will be found to have a constant value until the electrodes reach the transition zone, whereafter the resistance readings start to increase. The readings continue to increase until stabilizing at a high value, corresponding to the electrodes being immersed in the exhausted zone.

In an ordinary softening process, further very slight oscillations may still be observed as the water continues to flow over the exhausted bed, probably because the waters normally contain both calcium and magnesium, the ions of which are the ions which saturate the exhausted column, and the column may remain saturated with one of the ions which is subsequently replaced by ions of the other type. These slight variations are unimportant, first because they are very small and second because in industrial water softening regeneration should have occurred a long time before the small variations start.

Clearly, therefore, a control procedure based on measuring the resistance of the resin in the bottom part of the bed could be devised; unfortunately, the problem is in practice very complex for the following reasons:

a. The resistance actually measured is the resistance of the resin particles surrounded by the water and not the intrinsic resistance of the resin; consequently, the resistance of the water has a considerable effect on the resistance reading. The resistance of the water depends upon its dissolved salt contents, which may vary widely depending on the particular supply available. The resistivity levels of regenerated resin and exhausted resin therefore vary very greatly from one individual case to another, to the extent that the resistivity of the exhausted bed when used to treat one particular water may be less than the resistivity of the regenerated bed when a different water is treated.

b. The resistance of the resin is temperature-dependent, and so the resistance both of the regenerated bed and of the exhausted bed vary with temperature.

To obviate these disadvantages, apparatus have been suggested which measure not resistances but the resistance difference between two pairs of electrodes placed at different levels in the exchange bed. After regeneration the observed difference is zero, but as exhaustion spreads and the transition zone reaches the upper electrode pair, a difference is detected which can be used to trigger a warning or start a timed regeneration programmer.

This step obviates the disadvantages mentioned but is not fully satisfactory for the following reasons:

a. The apparatus detects only differences and therefore gives no warning when both electrode pairs detect the same resistance, whether because the bed is regenerated or exhausted or regenerating (steeped in a regenerating solution).

b. The value of the detected resistance difference depends on the resistance of the water too, and so if the water is a good conductor of electricity, the resistance difference is less than if the water is a poor conductor of electricity. The warning cannot be arranged to operate at the minimum detected difference, since a safety margin sufficient to preclude random operation must be left, and when the water being processed has a high dissolved salts content the zone available for this signal may be very small, and so it is impossible to allow a satisfactory safety margin.

The method and apparatus of this invention obviates these disadvantages and provides effective control of all phases which the exchanger passes in a manner which no other known apparatus or process can provide.

Basically, the invention is based on the following consideration.

A number of tests were made with waters of very different compositions, the resistances in the ion bed being measured in each case, the resin being in sodium form and exhausted. The differences between the two resistances were found to vary considerably from one another in the various cases, but the ratio between the resistances was relatively constant. Consequently, an apparatus able to measure the quotient of the resistances between electrodes disposed in the bottom part of a resin bed and other electrodes measuring the resistance of the exhausted resin, the untreated water flowing continuously through the resin, would give temperature-compensated readings as in the previous case and would provide greater compensation for variations in water composition. The resulting apparatus requires substantially no adjustment within wide limits of composition of the water being treated.

In industrial experiments it has been found that the resistance of resin in its sodium form is from 55 to 57 percent of the resistance of the exhausted resin when the water used has a hardness of 15°TH (French) (= total 150 p.p.m. $CaCO_3$) with a total salt content of the order of 280 p.p.m., and this relationship is found to be from 58 to 60 percent for 198° TH water having 7,350 p.p.m. dissolved salt contents. Of course, the factor which differs considerably in these two cases is the residual hardness of the influent, but this is a different matter.

If the apparatus is calibrated so that the "resin exhausted" signal is given when the resistance measured in the bottom part of the bed is from 70 to 75 percent of the resistance of the exhausted resin, the apparatus can operate equally well with both the waters specified and with no adjustment.

Another advantage of a process or apparatus operating in accordance with these principles is that it can provide data and be used to perform various operations not feasible in any other way, viz:

1. If the apparatus comprises an indicating instrument (microammeter, recording chart etc.) for indicating the values of the resistance relationship mentioned, the instantaneous state of the exchange bed can be found at any time. The bed is immersed in a concentrated saline solution during regeneration, and so the resistance between the electrodes at the bottom of the bed is very low during regeneration—as a rule, less than 10 percent of the resistance of exhausted resin immersed in untreated water. When the apparatus is softening, the resin being in its sodium form, the measured value is normally somewhere between 45 and 65 percent, and when the resin between the electrodes is becoming or has become exhausted (end of cycle), the measured value is somewhere between 65 and 100 percent.

2. The difference in the resistance relationship or ratio as between when the regenerating solution is in the bed and when the apparatus is free of regenerating solution and is delivering softened water, can be used to operate a system triggering a signal (at some intermediate reading such as 40 percent); in cases in which regeneration is automatic, such a signal can serve to terminate the step of expelling the regenerating agent and to allow the water to pass to the output for softened water.

3. In a system using automatic regeneration, the apparatus according to the invention can be used to detect failure of the regenerating solution to enter the bed (regenerator tank empty, failure of pump or ejector etc.). In such a case the resistance ratio would not decrease to the considerable extent occurring when the regenerating solution is introduced. The automatic features can therefore be so devised that a warning is given if the resistance ratio fails to drop during the regeneration period.

None of these features can be provided by a process or apparatus which merely permits detection of resistance differences between two electrode pairs disposed at different levels in an exchange bed.

The system for obtaining these measurements will be discussed hereinafter, but for the time being further attention will be given to the electrodes. Conveniently, very small currents and relatively high frequencies of 1 kHz. or more are used. Satisfactory measuring electrodes for the resin can be devised preferably in the form of two stainless steel cylinders 1, 2 which can be seen in FIG. 1 and which are about from 35–40 mm. in diameter and from 10–12 mm. long and which are disposed, with a gap of from 50–70 mm. between them, on a plastics cylinder 3. The electrode 1 nearer the wall of the receptacle is earthed, as are all metal parts of the exchanger. The resistances measured are small, as a rule less than 100 ohms.

Figure 2:
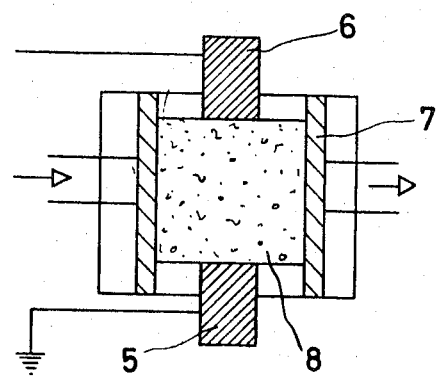
FIG. 2 shows an embodiment of the electrodes used to measure exhausted resins.

The reference electrode pair—i.e., the electrode pair measuring the resistance of the exhausted resin—can take the form of two stainless steel rods 5, 6 which can be seen in FIG. 2 and which are placed in a plastics cell 7; the same is full of resin 8 and is connected as a bypass on the untreated water intake line. There may be some practical disadvantages in this arrangement, since the resin must never be regenerated or washed (in contrast to what happens to the resin of the exchange bed), with the possibility of the resin 8 becoming soiled by impurities vehicled by the water; also, if the resin-retaining membrane becomes perforated, the resin may be lost. To obviate these possible disadvantages, the receptacle 5 just described for the resin 8 can be replaced by the facility to be describe hereinafter.

It has been found in many tests that the resistance measured by the electrodes in a resin bed can be regarded as two parallel resistances, one formed by the resistance of the water and the other by the resistance of the resin. This is observed by drawing a graph in which the ordinate represents the resistance measured between the electrodes and the abscissa represents the resistivity of the water. All the plots corresponding to resin in its sodium form or exhausted form can be connected to give curves which can be reproduced approximately and over a wide zone, the ordinate representing the resultant of assuming a resistance proportional to water resistivity in parallel to a fixed resistance, the abscissa representing water resistivity.

Figure 3:
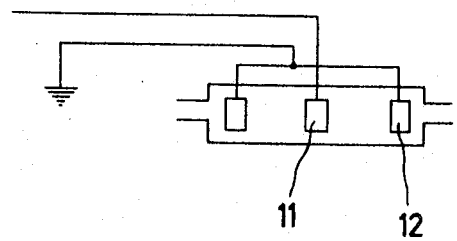
FIG. 3 is a diagrammatic view of an embodiment of the group of electrodes to measure the resistance of the untreated water.

The receptacle for the exhausted resin can therefore be replaced by a fixed resistance in parallel with a cell measuring the resistance of the untreated water. FIG. 3 shows one kind of electrode which has given a satisfactory result, on the basis of a single electrode 11 and a double (and earthed) electrode 12.

Figure 5:
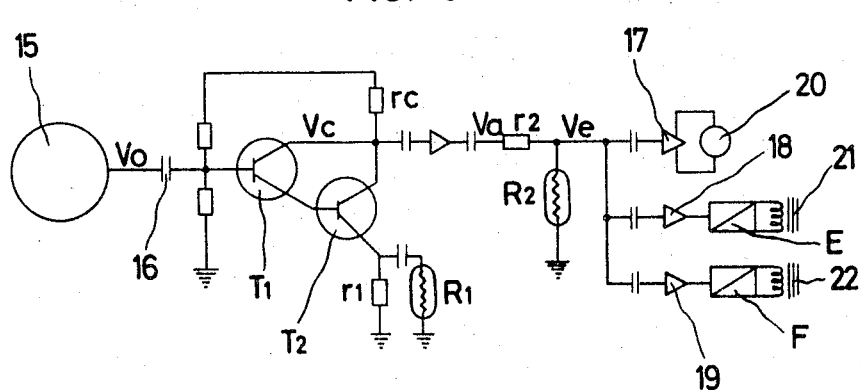
FIG. 5 is an electronic circuit diagram of an embodiment of the invention.

The circuit diagram of FIG. 5 shows a circuit arrangement of an apparatus according to the invention. An oscillator 15 operating at from 1 to 5 kHz. delivers a sinusoidal or rectangular or other oscillation of constant amplitude. A fixed proportion of the oscillator output voltage $V_o$ is applied to the base of transistor $T_1$. The DC emitter resistance is $r_1$ and the AC emitter impedance is $$p = \frac{r_1 \times R_1}{r_1 + R_1}$$
$$\gg$$

$p = r_1 \times R_1 / r_1 ! R_1$.

All the capacitors 16 can be considered shortcircuits at the operating frequency.

Resistance $r_1$ is fixed, and the resistance $R_1$ is the resistance of the receptacle through which the untreated water flows; $R_1$ is therefore variable. If $r_1$ is chosen appropriately $p$ is approximately proportional to the resistivity of the exhausted resin immersed in untreated water.

The collector AC voltage $Vc$ is inversely proportional to the resistance $p$; $Vc=k_1 1/p$. This voltage is amplified by A with a gain Ga, to become $Va=k_1 G_a 1/p=K_2 1/p$ if $r_2 \gg R2$; if the input impedances of amplifiers 17, 18, 19 are much larger than R2, then $Ve=Va/r^2R2=K2/r^2 \cdot {}^{R2/}p=K_3R2/p$, R2 denoting the resistance measured between the electrodes immersed in the bottom part of the exchange bed—i.e., $Ve$ is proportional to the quotient of the resistance of the resin in the bottom part of the bed, divided by the resistance of exhausted resin.

Via amplifier 17, $Ve$ can be read on an instrument 20 (microammeter recording chart etc.). The amplifiers 18, 19 drive bistable circuit elements E, F which change state at predetermined values of $Ve$, such values depending upon the respective gains G of the amplifiers 18, 19. The gains G can be adjusted to ensure triggering at the required levels, one level being associated with an indication of exhaustion and the other level being associated with the end of expulsion of the regenerating solution. The bistable elements actuate relays 21, 22 which are adapted either to trigger a warning or to initiate adjustments of the associated automatic systems at appropriate times.

Figure 6:
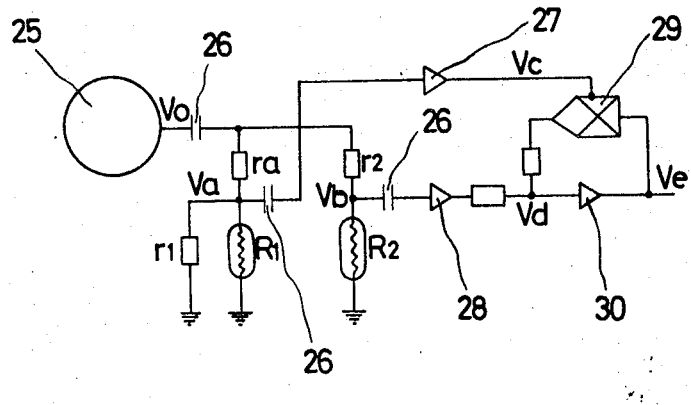
FIG. 6 is an electronic circuit diagram of an alternate embodiment of the invention.

FIG. 6 shows another electronic circuit of use in the apparatus according to the invention. An oscillator 25 operating on from 1 to 5 kHz. delivers an AC output voltage $Vo$; capacitors 26 can be considered shortcircuits at the operating frequency; $R_1$ denotes the resistance of the receptacle disposed in the untreated water entry line, and R2 denotes the resistance measured by the electrodes in the resin bed. Therefore, if $p \gg ra$ and $$R_2 \ll r_2 V p = \frac{r_1 R_1}{r_1 + R_1}; \quad Va = \frac{V_o}{ra} \cdot p$$

$$p = k_1 p \quad V_b = \frac{V_o}{r_2} R_2 = k_2 R_2$$

If the gains of amplifiers 27, 28 are $G_c$, $G_d$ respectively, then $V_c = k_1 Gp; V_d = k_2 G_d R_2$.

The circuit arrangement is the one conventionally used in analog computing to divide voltages by implicit computing, with the use of a multiplier 29 and an amplifier 30. Therefore:

$V_e = k_3{}^i d/V_c = k_3 k^a d/K_1 G_c \cdot R2/p = K\ R2/p$

The voltage $Ve$ can be amplified and used, as in the previous case, to operate a reading instrument and actuate relays.

As previously stated, an electronic device of the kind described delivers a voltage proportional to the resistance ratio:

$V = kR_r/R_c$ $R_r$ denoting the resistance measured between electrodes in a resin bed immersed in water, while $R_c$ denotes the resistance formed by a system of ohmic and electrolytic resistances appropriately arranged to reproduce either the resistance which the exhausted resin would have when immersed in the water being treated or a value proportional to the last-mentioned resistance. If this proportionality were correct and water of various compositions were passed through the bed of exhausted resin, the value obtained for V should always be constant whatever the resistivity of the water.

Figure 4:
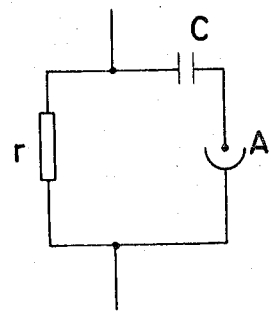
FIG. 4 is a diagrammatic view of an alternate embodiment of electrodes used to measure exhausted resin; alternate

Referring again to electrode configurations for measuring the resistance of an exhausted resin, the arrangement described in FIG. 4 comprises a fixed resistance $r$, a capacitor $c$ and a receptacle A flowed through by the water whose resistance is being measured. The sole function of the capacitor $c$ is to prevent any flow of DC through the water, but the value of capacitor $c$ is high enough for its impedance to be negligible to AC of the frequency used.

Figure 8:
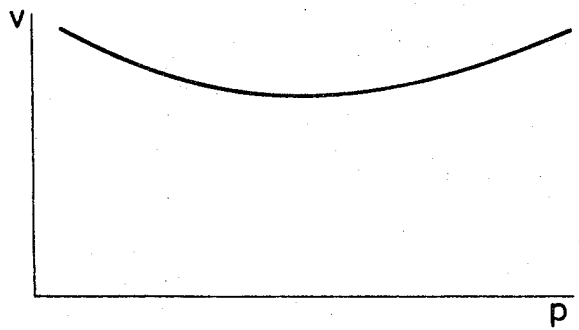
FIG. 8 is a graph showing the compensation provided by the embodiment shown in FIG. 4.

The compensation provided by the arrangement shown in FIG. 4 is good but not perfect, and the curve $V=f(\rho)1$ [rho]($\rho$ =resistance of the untreated water) has the shape shown graphically in FIG. 8.

Figure 9:
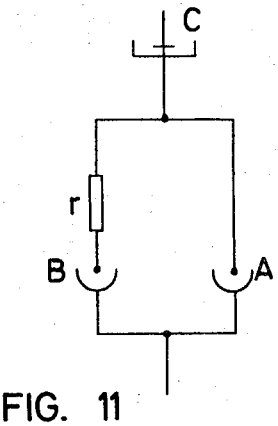
FIG. 9 is a diagrammatic view of another embodiment of the electrode configuration used to measure the exhausted resin.

Another embodiment of such an electrode arrangement according to the principles of the invention is shown in FIG. 9, where there can be seen a capacitor C and two receptacles A,B flowed through by the water; receptacle A has a constant which can be assumed to be unity, and the other receptacle B, which is in series with a resistance $r$, has a different constant which may depend on resin characteristics (size of balls). The receptacles are so chosen that the resistance previously measured in the receptacle B is much less than the resistance associated with the receptacle A. A typical value for B is from 5 to 10 percent of A, depending on individual circumstances.

Figure 7:
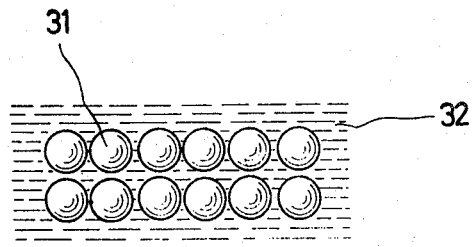
FIG. 7 is a diagrammatic view showing a chain of resin pebbles and the water in which they are immersed.

This embodiment corresponds to the physical representation shown in FIG. 7 where it is assumed that the resistance between the electrodes of a mass of resin 31 immersed in water 32 takes the form of a water resistance in parallel with two series resistances, one of them the intrinsic resistance of the resin 31 and the other the resistance of the water 32. This embodiment provides substantially absolute constancy of V for different values of water resistance; the variation found in tests made using Lewatit-S-100 was less than 2 percent over a range of water resistivity of from 800 to 4.000 ohms/cm.

Figure 10:
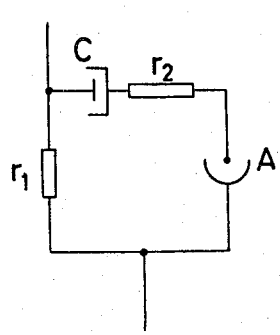
FIG. 10 is a diagrammatic view of still another embodiment of the electrode configuration used to measure the exhausted resin.
Figure 11:
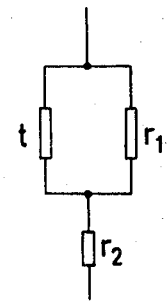
FIG. 11 is a diagrammatic view of an embodiment of the invention in which thermistors are used.

Another configuration which may be used which also falls under this invention and which is shown in FIG. 10 comprises a resistance $r_2$ in series with a receptacle A, and a resistance $r_1$ in parallel with A and $r_2$ and a capacitor C which is in series with $r_2$. No physical image can be given for this embodiment, which was devised to improve the embodiment shown in FIG. 4. It was found in the embodiment shown in FIG. 10 that when $r_1$ was increased, V was more constant at high water resistivities and less constant at low resistivities. $r_1$ is given a high value to ensure satisfactory response at high resistivities, where $r_2$ has substantially no effect on the total resistance of the arm formed by the capacitor C, the resistance $r_2$ and the receptacle A. The function of the resistance $r_2$ is to ensure a satisfactory response at low water resistivities, when $r_2$ makes up a considerable proportion of the total resistance of the arm, so as to flatten out the response at low water resistivities. In tests using Lewatit-S-100, the maximum variation was in the region of 6 or 7 percent for a variation in water resistivity of from 800 to 4.000 ohms/cm.

The steps described make it possible to obtain a value of V which is substantially independent of water resistivity.

However, there is no compensation for changes in the intrinsic resistance of the resin due to temperature changes. One way of obtaining temperature compensation is to replace each of the fixed resistances of the electrode configurations hereinbefore described by a group of three resistances, one of which is a thermistor $t$ and the other two $r$ and $r_2$ are fixed resistances. By this feature, and provided that the fixed resistance and thermistor values are appropriate, total resistance can be varied in a manner approximately proportional to temperature variations. Variations in the intrinsic resistance of the exhausted resin can be assumed to be proportional to temperature variations when the same are small.

The system shown in FIG. 9 when used together with the group of fixed resistances and a thermistor can provide very satisfactory temperature compensation. The temperature compensation provided by the two other systems is not so satisfactory even though the variations in this case too are very reduced. The thermistors must be placed in a capsule in contact with the water, to preclude direct contact between the thermistor and the water, for shortcircuits would then occur, but also so that the thermistor is always at the same temperature as the water (and the resin), to ensure that the compensation is operative.

What I claim is:

1. Apparatus for producing a signal indicative of the state of the exhaustion of an ion exchange material, comprising:
    a bed of ion exchange material,
    a source of solution to be treated by said ion exchange material,
    means for receiving said solution after treatment by said ion exchange material,
    conduit means connecting said source and said means for receiving for passing said solution through the said bed of ion exchange material,
    container means having therein a quantity of said ion exchange material in an exhausted state,
    means for passing at least a portion of said solution to be treated through said container means and through said exhausted ion exchange material prior to passing said solution through said bed of ion exchange material,
    first means for determining the electrical resistance between at least two points in said bed of ion exchange material adjacent the effluent end of said bed of ion exchange material and for producing a first signal proportional to the value of same,
    second means for determining the electrical resistance between at least two points in said exhausted ion exchange material and for producing a second signal proportional to the value of same, and
    means for determining the value of a ratio of one of said signals to the other and for producing an output signal indicative of same.

2. The apparatus defined in claim 1 wherein:
    said first signal is a voltage having a value proportional to the resistance of said ion exchange material,
    said second signal is a voltage having a value proportional to the resistance measured in said container means and
    said means for determining comprises electrical circuit means for determining a ratio of one of said voltages to the other and for producing an output signal voltage of a value proportional to the value of said ratio.

3. Apparatus for producing a signal indicative of the state of exhaustion of an ion exchange material, comprising:
    a bed of ion exchange material,
    a source of solution to be treated by said ion exchange material,
    means for receiving said solution after treatment by said ion exchange material,
    conduit means, connecting said source and said means for receiving for passing said solution through said bed of ion exchange material,
    a container,
    means for passing at least the portion of said solution to be treated through said container prior to passing said solution through said bed of ion exchange material,
    first means for determining the electrical resistance between at least two points in said bed of ion exchange material adjacent the effluent end of said bed of ion exchange material and for producing a first signal proportional to the value of same,
    a fixed resistance equivalent to the resistance of the exhausted ion exchange material,
    second means for determining the electrical resistance of a combination of said fixed resistance and the resistance of said solution passing through said container means and for producing a second signal proportional to the value of same, and
    means for determining the value of a ratio of one signal to the other and for producing output signal indicative of same.

4. The apparatus defined in claim 3 wherein said combination of resistances comprises the parallel combination of a fixed resistance and the resistance of said untreated solution measured between at least two points in said container means.

5. The apparatus defined in claim 3 wherein said combination of resistances comprises first and second parallel resistance branches, said first branch comprising a fixed resistance and said second branch comprising the series combination of a fixed resistance and the resistance of said untreated solution measured between at least two points in said container means.

6. The apparatus defined in claim 3 wherein:
    said container means comprises two containers having at least a portion of the solution to be treated flowing therethrough, one of said containers having a resistance constant greater than the other, and wherein
    said combination of resistances comprises first and second parallel resistance branches, said first branch comprising the series combination of a fixed resistance and the resistance of said solution in the other of said containers and said second branch comprises the resistance of said solution in said one container.

7. Apparatus for determining the state of exhaustion of ion exchange material and for controlling an ion exchange system responsive to said determination, comprising:
    a bed of ion exchange material,
    a source of solution to be treated by said ion exchange material,
    means for receiving said solution after treatment by said bed of ion exchange material,
    conduit means connecting said source and said means for receiving for passing said solution through said ion exchange material,
    container means having therein a quantity of said ion exchange material in an exhausted state,
    means for passing at least a portion of said solution to be treated through said container means and through said exhausted ion exchange material prior to passing said solution through said bed of ion exchange material,
    first means for determining the value of the electrical resistance between at least two points of said bed of ion exchange material adjacent to the effluent end of said bed of ion exchange material and for producing a first signal indicative of the value of same, second means for determining the value of the electrical resistance between at least two points in said exhausted ion exchange material and for producing a second signal indicative of the value of same, means for determining the value of a ratio of one of said signals to the other and for producing an output signal indicative of same, and means for utilizing said output signal comprising measurement means to provide a measurement of the state of exhaustion of said ion exchange material and a control means for controlling the operation of said ion exchange responsive to the values of said output signal.

* * * * *